(12) United States Patent
Yamanaka et al.

(10) Patent No.: US 6,771,848 B2
(45) Date of Patent: Aug. 3, 2004

(54) OPTICAL SWITCH AND METHOD OF CONTROLLING THE SAME

(75) Inventors: Takashi Yamanaka, Chiba (JP); Masao Kasuga, Chiba (JP); Akihiro Iino, Chiba (JP); Kenji Suzuki, Chiba (JP); Tomohiro Shimada, Chiba (JP)

(73) Assignee: Seiko Instruments Inc., Chiba (JP)

( * ) Notice: Subject to any disclaimer, the term of this patent is extended or adjusted under 35 U.S.C. 154(b) by 157 days.

(21) Appl. No.: 09/951,155

(22) Filed: Sep. 13, 2001

(65) Prior Publication Data

US 2002/0085790 A1 Jul. 4, 2002

(51) Int. Cl.[7] ............................................. G02B 6/26
(52) U.S. Cl. ........................................................ 385/16
(58) Field of Search ................................ 385/16, 15, 31, 385/33, 42, 43, 47

(56) References Cited

U.S. PATENT DOCUMENTS

| | | | |
|---|---|---|---|
| 5,390,266 A | 2/1995 | Heitmann et al. | 385/44 |
| 5,675,296 A | 10/1997 | Tomikawa | 331/158 |
| 5,796,884 A | 8/1998 | Wingo | 385/16 |
| 6,094,293 A | 7/2000 | Yokoyama et al. | 359/280 |

FOREIGN PATENT DOCUMENTS

| | | |
|---|---|---|
| EP | 0569187 | 11/1993 |
| EP | 1176741 | 1/2002 |

OTHER PUBLICATIONS

Patent Abstracts of Japan, vol. 017, No. 116 (P–1499) Mar. 10, 1993 & JP 04301812 A (Furukawa Electric Co. Ltd:The), Oct. 26, 1992.

*Primary Examiner*—Khiem Nguyen
(74) *Attorney, Agent, or Firm*—Adams & Wilks

(57) ABSTRACT

An optical switch has an input section for inputting a light beam and movable optical members each comprised of a piezoelectric actuator for inputting the light beam from the input section and for individually switching an optical path of the light beam. Each of the piezoelectric actuators has a piezoelectric body for undergoing oscillating movement and a movable body frictionally driven by oscillating movement of the piezoelectric body. A driving control device drives the piezoelectric bodies of the piezoelectric actuators and controls positions of the piezoelectric bodies to switch the optical path of the light beam. An output section outputs the light beam from the piezoelectric actuators.

19 Claims, 9 Drawing Sheets

OPTICAL SWITCH AND METHOD OF CONTROLLING THE SAME

BACKGROUND OF THE INVENTION

1. Field of the Invention

The present invention relates to an optical switch used in, for example, an optical network of a high-density light wavelength multiplex system and to a method of controlling the same and, more particularly, to a compact multifunctional optical switch and a method of controlling the same.

2. Description of the Related Art

In recent years, with rapid spread of the internet or the like, a communication transmitting system is shifting to a system using an optical fiber. Further, with an object of higher density formation of transmission capacity, there is being adopted a WDM (Wavelength Division Multiplexing transmission system using optical multiplexing conversion. In order to adopt the WDM system, an optical control communication module for synthesizing/dividing, switching, or attenuating optical signals having different wavelengths becomes indispensable.

As conventional examples of an optical switch for switching light, there are technologies disclosed in, for example, Japanese Patent Laid-Open No.301812/1992 and Japanese Patent Laid-open No.264415/1992. The former optical switch is constructed by a constitution in which waveguides are formed in a shape of a lattice, slits are provided at intersections of the waveguides, mercury, silicone and air are movably interposed at the slits and mercury or silicone interposed at the waveguides are switched by heating these to move to thereby control light. The latter switch is constructed by a constitution in which communicating tubes are provided at intersections of waveguides, a liquid is filled (sealed) in the communicating tubes while constituting gaps and sizes of the gaps are adjusted by heating the liquid and vaporizing portions thereof to thereby control light.

However, according to the above-described two optical switches, the waveguides, the slits and the gaps must be formed (arranged) accurately. Furthermore, mercury or the like or the liquid must be sealed. Accordingly, there poses a problem that fabrication of the optical switches is difficult.

Further, the temperature of mercury or the like or the liquid needs to be controlled accurately and, accordingly, the size of supplementary mechanisms other than the main body of the optical switch, such as heating mechanism, a temperature sensor and a control mechanism thereof, become large. Furthermore, the number of parts is also increased. That is, the optical switch cannot be made compact, and fabrication thereof is complicated.

It is an object of the invention to provide an optical switch which is compact and has high productivity and to provide a method of controlling the optical switch.

SUMMARY OF THE INVENTION

In order to resolve the above-described problems, an optical switch according to the invention characterized in comprising an input section for inputting a light beam, optical parts each having an optical path changing characteristic movable to a position of blocking the light beam of specially selected wavelength outputted from the input section, output sections provided respectively in correspondence with a case in which the optical path is not changed by the optical parts, driving means for separately driving the optical parts, and driving control means for controlling to arrange the optical parts via the driving means and selecting the output sections constituting output destinations of the light beam. The optical switch can be made compact since a temperature sensor or the like is not. Furthermore, productivity is increased since there is not a member which needs fine fabricating steps as in a conventional member such as a waveguide or the like.

Here, there may be constructed a constitution comprising a plurality of the optical parts in a series direction relative to the light beam and comprising the output sections in correspondence with respectives of the optical parts, and there may be constructed a constitution comprising a plurality of the input sections in a parallel direction and comprising the optical parts in correspondence with respectives of the light beams of specially selected wavelength from the input sections.

As a most general constitution, there is exemplified a constitution comprising two of the input sections in a parallel direction, comprising two of the output sections in the parallel direction at positions opposed to the input sections and comprising two of the optical parts for determining the output destinations of the light beams of specially selected wavelength for the respective light beams. In the case of constructing the constitution, a further large-scaled optical switch can be constituted by connecting a plurality of the optical switches, for example, in a shape of a matrix.

Further, in the case of providing a plurality of the driving means, although it is necessary to widen an interval between the optical parts such that front and rear ones of the optical parts and the driving means do not interfere with each other, when the front and rear ones of the driving means relative to the light beam are arranged in a zigzag shape between the same optical parts, the interval between the optical parts can be narrowed. That is, the optical switch can be made further compact.

In this case, when there is constructed a constitution in which the moving optical members integrating the driving means to the optical parts are arranged in a zigzag shape such that the driving means are disposed between the same optical parts interposing the light beam, the productivity in assembling is promoted.

Further, as the driving means, for example, there is used a piezoelectric actuator. In this case, when there is constructed a constitution comprising a piezoelectric body producing an elongating and contracting oscillation and a moving body frictionally driven by the elongating and contracting oscillation produced to the piezoelectric body, the optical switch can further be made compact since there is constituted the driving means which is compact and having high torque More specifically, there is used a piezoelectric actuator of a rotational type or a linear type.

Further, when the driving means is a piezoelectric actuator, the following constitution can be constructed.

First, the control means may be constructed by a constitution of inputting a preparatory signal before driving operation. In this case, the piezoelectric actuator is warmed up by the preparatory signal to thereby improve response performance and accordingly, the response of the optical switch can be promoted.

Further, when the control means is constructed by a constitution having a self-excited oscillating circuit, the piezoelectric actuator can be driven more efficiently.

Further, when there is provided a support member for movably supporting the optical part and the control means is provided to the support member, a space is effectively utilized and the optical switch can further be made compact.

Further, in the above-described optical switch, when the plurality of optical parts are controlled to drive simultaneously, a time period necessary for switching the optical parts can be shortened. That is, the response of an optical communication apparatus is enhanced.

BRIEF DESCRIPTION OF THE DRAWINGS

FIG. 6 illustrates views showing a constitution of an optical switch according to a third embodiment of the invention in which

FIG. 7 illustrates views showing a constitution of an optical switch according to a fourth embodiment of the invention in which

DETAILED DESCRIPTION OF THE PREFERRED EMBODIMENTS (First Embodiment)

First, an explanation will be given of an outline constitution in reference to a block diagram.

Figure 1:
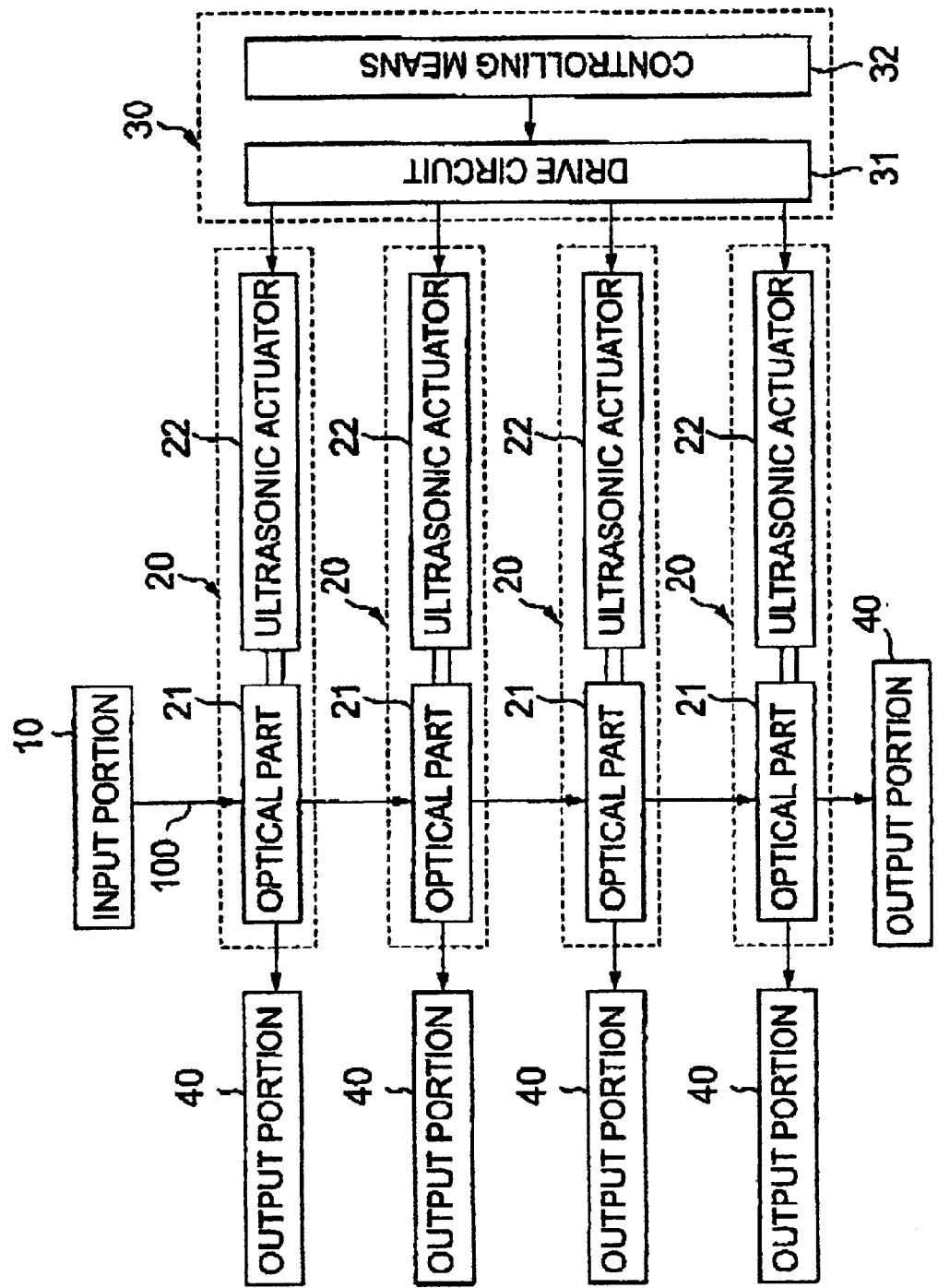
FIG. 1 is a block diagram showing a constitution of an optical switch according to a first embodiment of the invention.
Figure 2A:
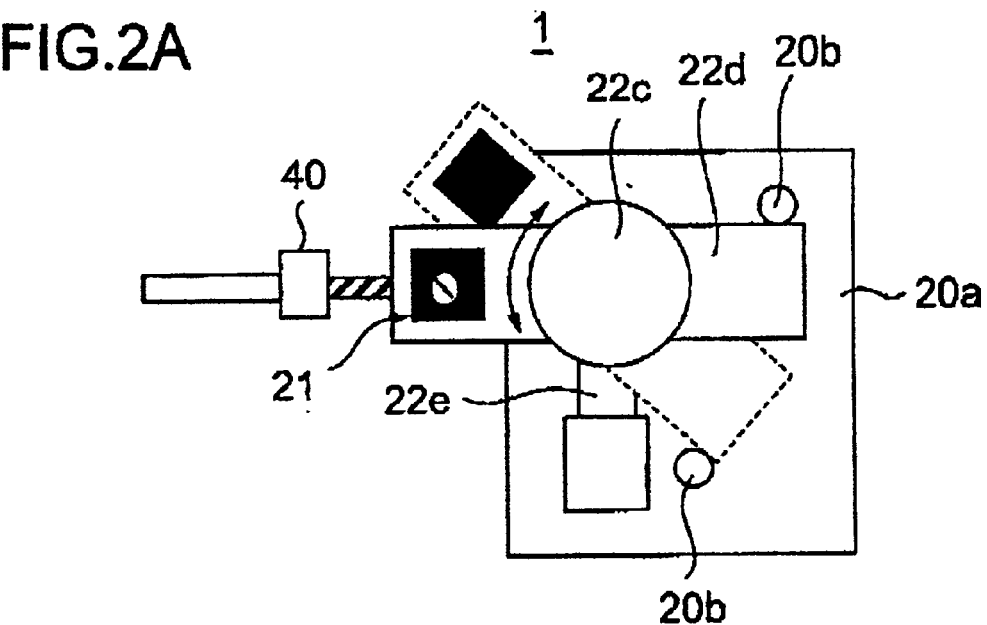
FIG. 2A is an outline view of a section of the optical switch of FIG. 1.
Figure 2B:
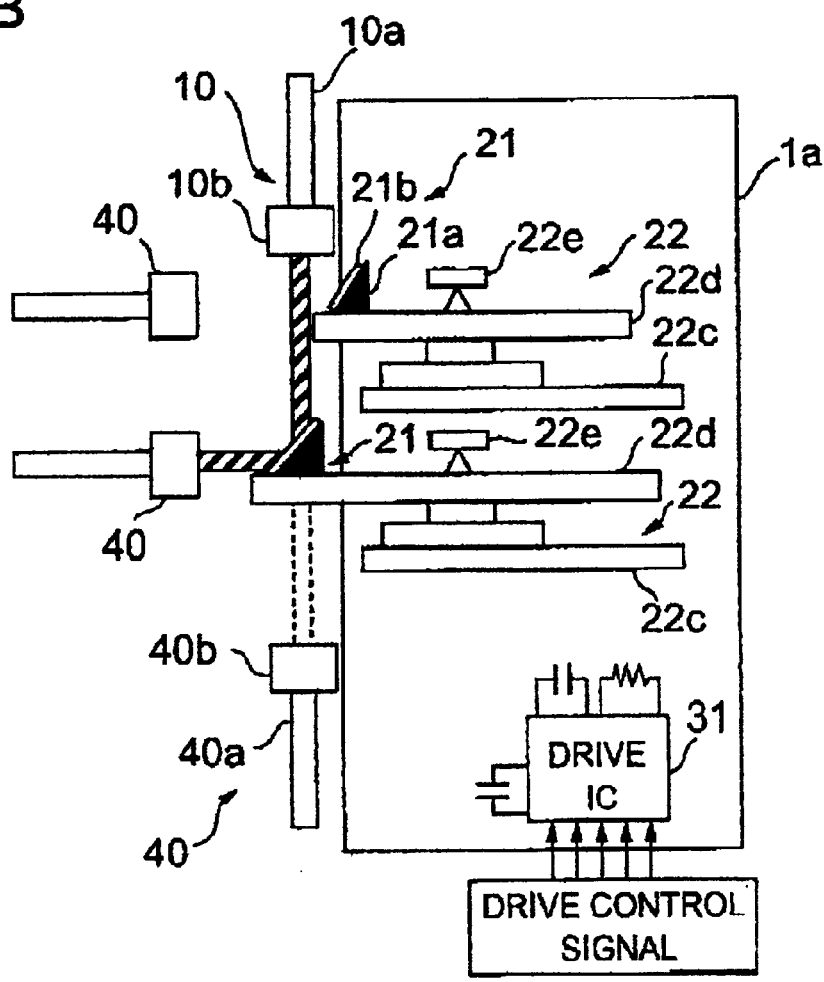
FIG. 2B is an outline view of an upper face of the same.

As shown by FIG. 1 and FIGS. 2A and 2B, an optical switch 1 is generally constituted by an input section 10 for inputting a light beam 100, a plurality of moving optical members 20 for bending a specially selected wavelength light beam of inputted the light beam 100 substantially by 90°, a driving control means 30 for controlling positions of the respective moving optical members 20, and a plurality of output sections 40 constituting output destinations of the light beam 100. That is, the optical switch 1 is an optical switch for determining a progressing direction of the light beam 100 inputted from the input section 10b the moving optical member 20 and thereafter outputting the light beam 100 from the output section 40.

Here, as shown by FIG. 2B, the moving optical members 20 are arranged in series relative to the light beam 100 when the light beam 100 advances straight. Further, the output section 40 outputs the light beam 100 when the light beam 100 advances straight. Further, the output section 40 outputs the light beam 100 when the progressing direction is changed by the moving optical member 20. Therefore, the output sections 40 are respectively provided for whether the moving optical members 20 change the progressing direction of the light beam 100.

As shown by FIG. 2B, the input section 10 is provided with an optical fiber 10a and a lens 10b. The output section 40 is also provided with an optical fiber 40a and a lens 40b similarly.

The moving optical part 20 is constituted by an optical part 21 and an ultrasonic actuator 22 and controls an optical signal by moving the optical part 21 to a position of blocking the optical signal or removing the optical part 21 from a blocking position by the ultrasonic actuator 22. As shown by FIG. 2A, the moving optical member 20 is attached to a side face of a support member 20a (illustration of which is omitted in FIG. 2B).

The optical part 21 is, for example, a slit or a mirror for refracting or reflecting the light beam 100 to thereby bend an optical path thereof substantially by 90° when the optical part 21 is arranged at a position of blocking the light beam 100 and outputting the light beam 100 from a corresponding one of the output section 40. Further, the optical part 21 can be constituted not only by a single part but also by a plurality of parts. For example, in FIG. 2, the optical part 21 is constituted by an optical member 21a having a function of changing the optical path and an optical member 21b having at least one characteristic in optical characteristics of transmitting wavelength, absorbing wavelength, optical amount, phase and so on and can simultaneously change the optical path and control light.

Figure 3:
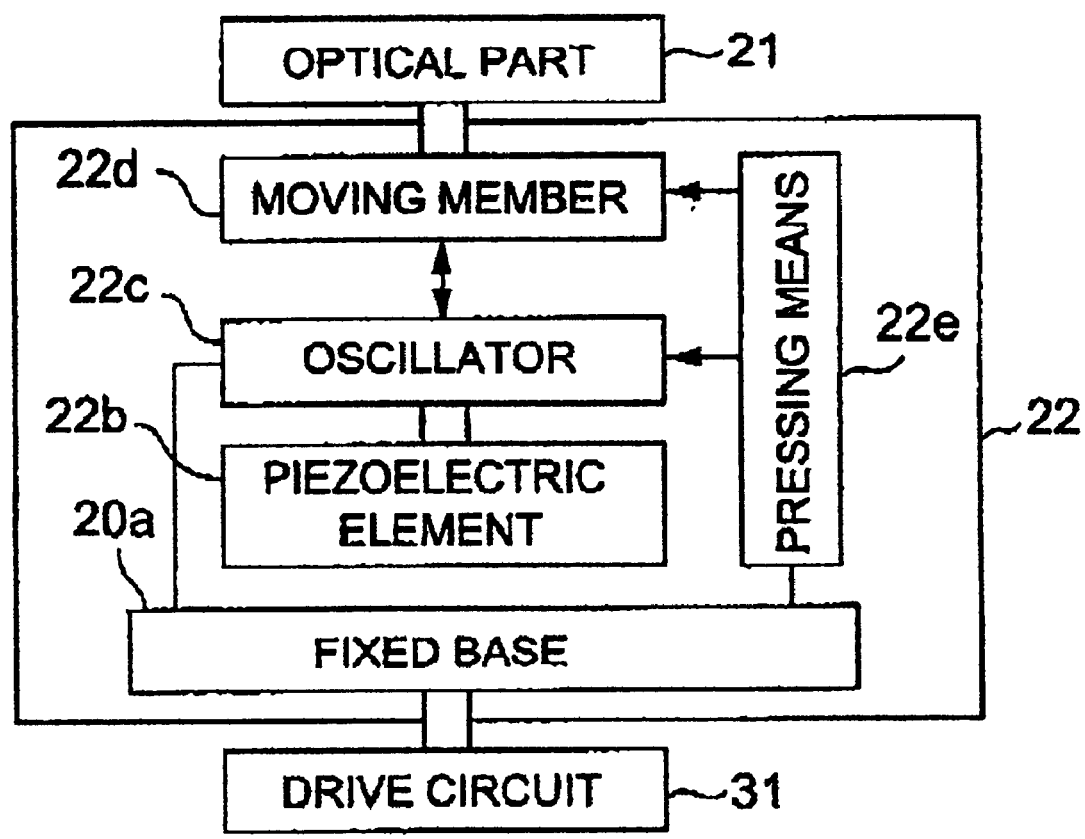
FIG. 3 is a block diagram showing a constitution of a moving optical member of FIG. 1.

The ultrasonic actuator 22 is, for example, a piezoelectric actuator of a rotational type and is generally constituted by a piezoelectric element 22b in a shape of a circular disk fixed above a fixed base 22a, an oscillator 22c provided integrally with the piezoelectric element 22b, a moving body 22d mounted on the oscillator 22c and pressing means 22e for ensuring contact pressure between the oscillator 22c and the moving body 22d as exemplified in FIG. 2 and FIG. 3. Bending oscillation produced at an upper face of the piezoelectric element 22b is amplified by the oscillator 11c and is outputted from a projection (not illustrated) on the oscillator 11c to the moving body 22d as drive force. Further, the moving body 22d fixedly holds the optical part at one end thereof.

Here, the moving body 22d of the ultrasonic actuator 22 is formed in a rod-like shape and is rotated with a vicinity of the center as a rotational shaft. Further, the moving body according to the invention may be constituted by a plurality of members in accordance with its use.

Further, at the side face of the support member 20a, there are provided two projections 20b on a rotational circumference of other end of the moving body 22d to sandwich the other end. That is, a pivoting range of the moving body 22d is restricted by the two projections 20b. One of the projections 20b is installed such that the optical part 21 provided at the one end of the moving body 22d is disposed at a location of blocking the light beam 100 at a vicinity of a side end of the support member 20a and other of the projections 20b is installed such that the moving body 22d as well as the optical part 21 are disposed at an escaping position constituting a location at which the optical part 21 does not interfere with the light beam 100. Further, by such structure, primary moment of the moving body 22d can be reduced.

As shown by FIG. 1, the driving control means 30 is constituted by, for example, a drive circuit 31 and control means 32.

Figure 4:
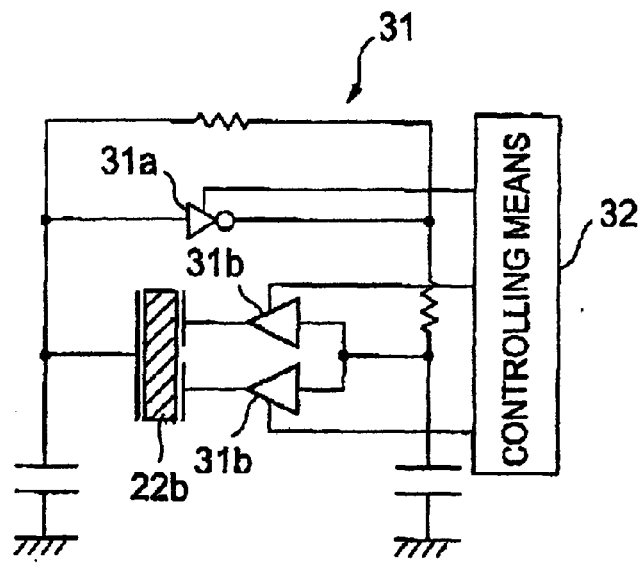
FIG. 4 is a block diagram showing an example of a drive circuit of FIG. 1.

Among them, the drive circuit 31 is a well-known self-excited oscillation circuit exemplified in FIG. 4 for amplifying a periodic voltage variation between two faces of the piezoelectric element 22b produced by piezoelectric oscillation and using the periodic voltage variation as a drive signal of the piezoelectric element 22b per se. The drive circuit 31 is formed, for example, by IC and is attached on a base plate 1a of the optical switch 1.

Here, an inverted amplifier 31a and an amplifier 31b in the drive circuit 31 are controlled by the control means 32. Thereby, the ultrasonic actuator 22 is controlled by the control means 32.

Further, the control means 32 moves to rotate the respective optical parts 21 by controlling the ultrasonic actuators 22 and at this occasion, in order to shorten a switching time period, a new one of the optical part 21 is arranged to a position of blocking the light beam 100 and at the same time, the optical part 21 arranged at the position of blocking the light beam 100 is returned to the escaping position.

Further, the control means 32 inputs a preparatory signal to the ultrasonic actuator 22 before moving to rotate the optical part 21 by actually driving the ultrasonic actuator 22. By inputting the preparatory signal, the ultrasonic actuator 22 is brought into a warmed-up state and response in inputting the drive signal for actually driving the ultrasonic actuator 22 is promoted.

Here, as the preparatory signal, there is a drive signal in a direction opposed to a direction of actually driving the ultrasonic actuator 22 or a very week drive signal to a degree of not moving the moving body 22d. In the former case the moving body 22d is pressed to the projection 20b by the drive force and the moving body 22d is not moved.

According to the optical switch 1 having the above described constitution, the output section 40 constituting the output destination of the light beam 100 can be switched by pertinently selecting the optical part 21 arranged at the position of blocking the light beam 100 by pertinently controlling the respective moving optical member 20. That is, the optical switch 1 functions as an optical switch.

Further, the optical switch 1 can be made compact since a temperature sensor or the like is not necessary and is not provided with a member which needs conventional fine fabricating steps as in the waveguide and therefore, the productivity is increased.

Further, a control state of the light beam 100 can be maintained without operating the ultrasonic actuator 22 by conducting electricity thereto. Accordingly, energy consumption of the optical switch 1 can be reduced.

Further, an angle of inputting light beams and outputting light beams are not restricted 90° depend on characteristic of the optical part 21. And, Other example of the optical part 21 is a prism or a flat plate. Moreover, The moving optical members 20 are arranged conformity by characteristic of the optical part 21 and by a fixed angle to the inputting light beam.

(Second Embodiment)

Figure 5:
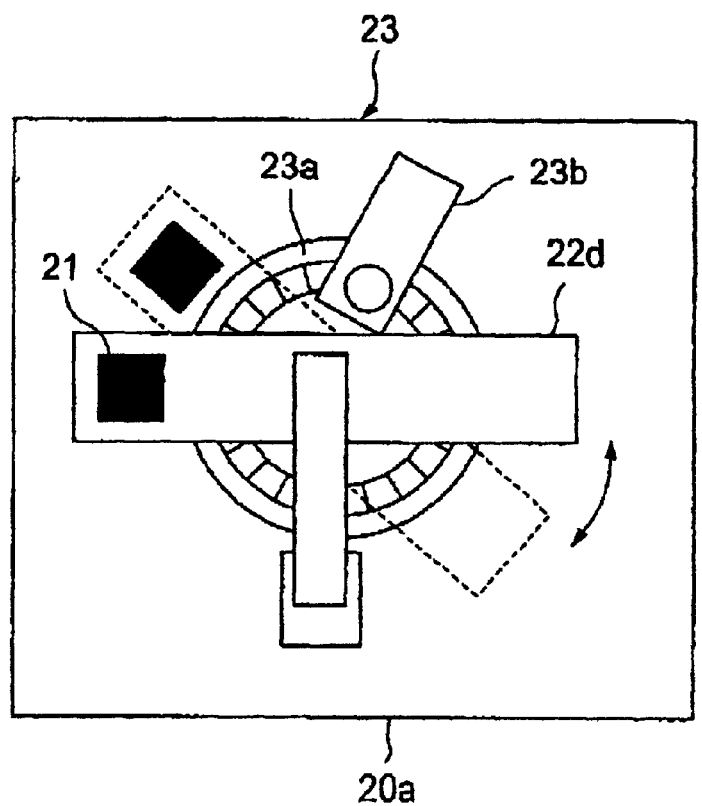
FIG. 5 is a view of essential portions of an optical switch according to a second embodiment of the invention.

The optical switch 1 according to a second embodiment of the invention is generally constructed by a constitution similar to that of the second switch 1 according to the first embodiment. Particularly, as shown by FIG. 5, there is constructed a constitution in which an encoder 23 is provided to the moving optical member 20 without providing the projections 20b and the control means 32 is provided with a function of controlling the ultrasonic actuator 22 based on a result of detection from the encoder 23.

The encoder 23 is constituted by slits 23a rotated along with the moving body 22d and a rotation amount detector 23b of a well-known optical type for detecting a rotation amount of the slits 23a. The result of detection of the rotation amount detector 23b is transmitted to the control means 32.

According to the embodiment, not only an effect similar to that of the first embodiment is achieved but also the moving body 22d can be controlled by an arbitrary angle, Further, there is not a possibility of causing a drawback accompanied by bringing the projection 20b into contact with the moving body 22d.

(Third Embodiment)

Figure 6A:
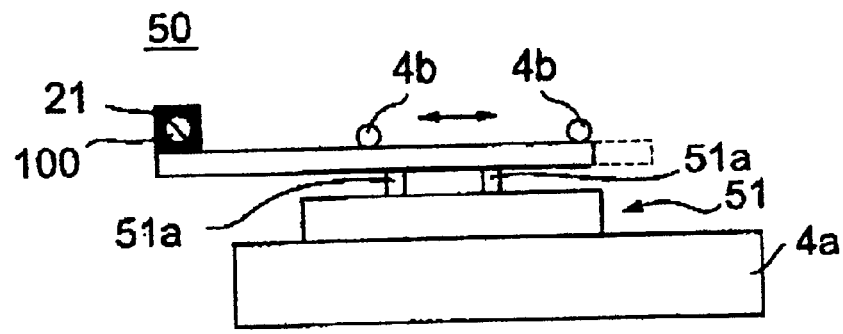
FIG. 6A is a front view of essential portions and FIG. 6B is a top view.

Although an optical switch 2 constituting a third embodiment of the invention is generally constructed by a constitution the same as that of the optical switch 1, as shown by FIG. 6A, a moving optical member 50 is used in place of the moving optical member 20. Further, the drive circuit 31 is provided directly on a main plate 2a of the optical switch 2.

Figure 6B:
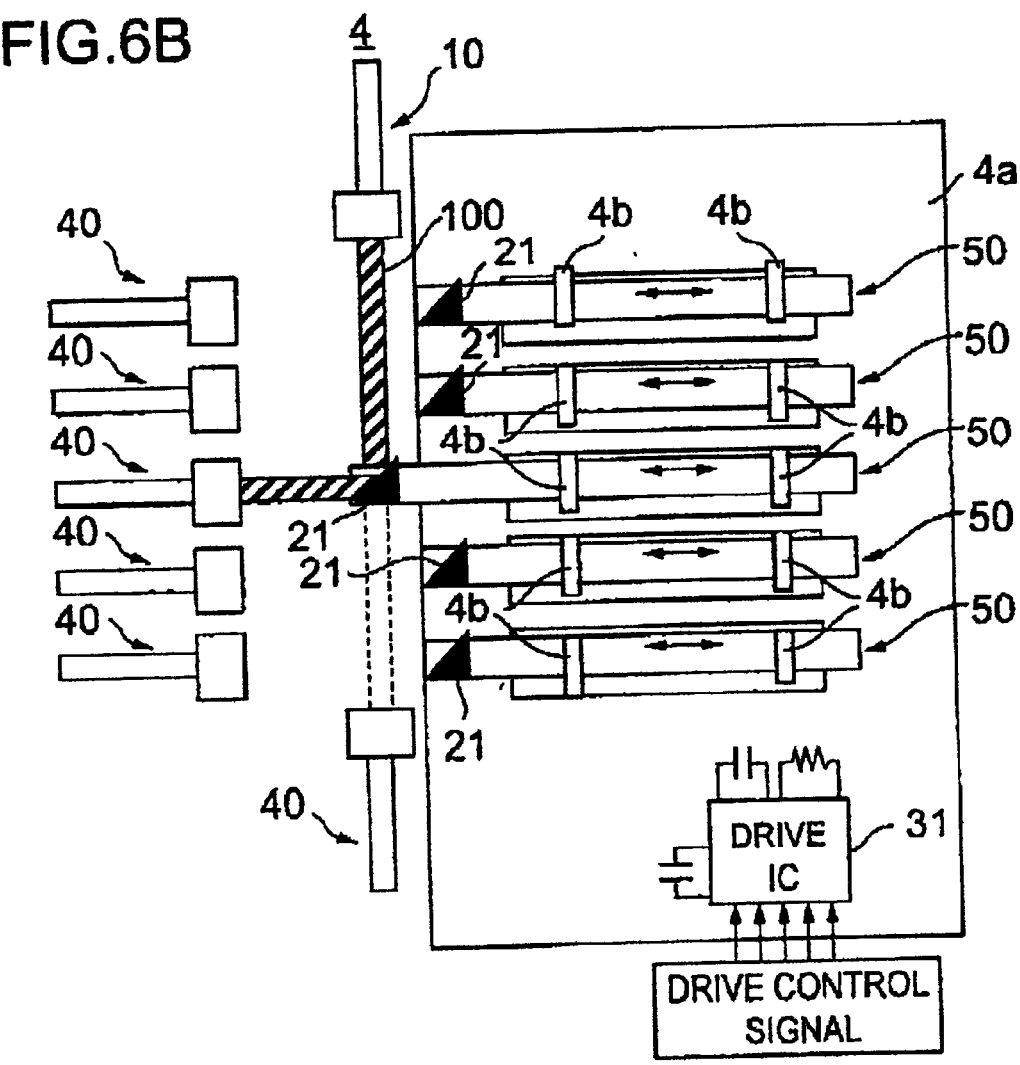

As shown by FIG. 6B, the moving optical member 50 is constructed by a constitution in which the optical part 21 is linearly moved in a direction of intersecting with the light beam 100 by an ultrasonic actuator 51 which is a piezoelectric actuator of a linear type.

The ultrasonic actuator 51 is provided with a piezoelectric element and an oscillator in a shape of rectangular parallelepiped, amplifies bending oscillation produced at an upper face of the above-described piezoelectric element by the above-described oscillator and outputs the bending oscillation from a projection 51a on the oscillator as drive force.

Here, the optical part 21 is sandwitched by two stopper members 2b erected on the base plate 2a and is made movable between the stopper members 2b.

One of the stopper members 2b is positioned to be brought into contact with the optical part 21 when the optical part 21 is moved to the position of blocking the light beam 100 and other of the stopper members 2b is positioned to be brought into contact with the optical part 21 when the optical part 21 is deviated from the position of blocking the light beam 100.

Further, the preparatory signal by the control means 32 constitutes a very weak drive signal in the optical switch 1 or a signal of driving the optical part 21 in a direction of being brought into contact with the stopper member 2b.

That is, according to the optical switch 2, there is achieved an effect similar to that of the optical switch 1 by switching the optical part 21 arranged to block the light beam 100 by driving the ultrasonic actuator 51.

(Fourth Embodiment)

Figure 7A:
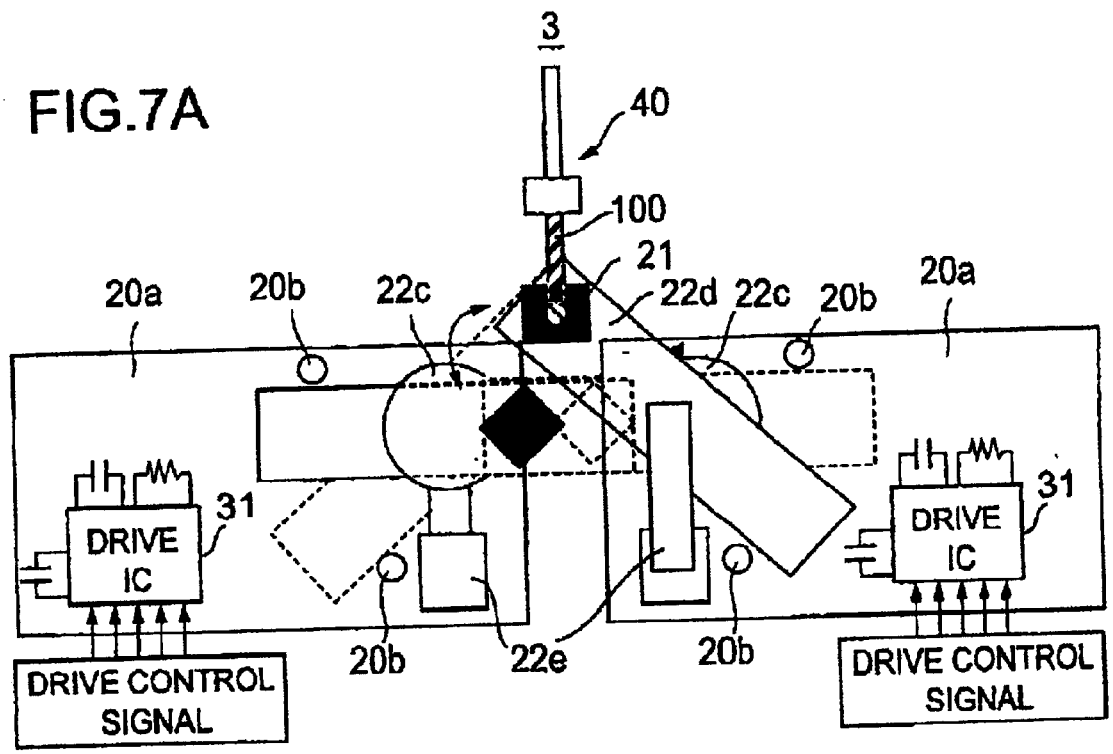
FIG. 7A is an outline view of a vertical section.
Figure 7B:
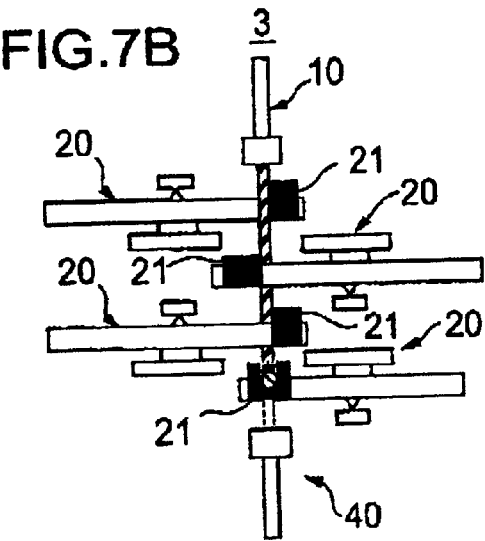
FIG. 7B is an outline view of an upper face of the same and FIG. 7C is an outline view of a side face.
Figure 7C:
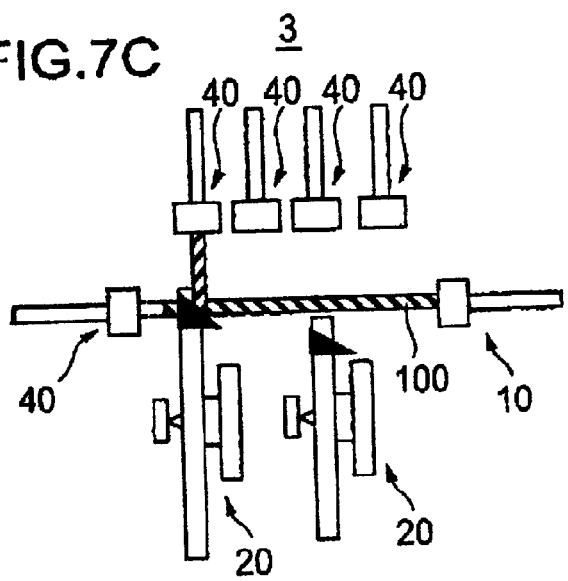

Although an optical switch 3 constituting a fourth embodiment of the invention is generally constructed by a constitution the same as that of the optical switch 1, as shown by FIGS. 7A and 7B, there is constructed a constitution in which the moving optical members 20 are arranged by alternately interposing the light beam 100 and the drive circuit 31 is attached to a side face of the support member 20a, preferably, a side face thereof on a side of attaching the moving optical member 20 with an object of compact formation of the optical switch 3.

The input section 10 is provided on a slightly upper side of the moving optical members 20. Therefore, the light beam 100 is propagated on a slightly upper side of the moving optical members 20.

Further, the optical part 21 is integrated to the ultrasonic actuator 22 in a direction of bending the light beam 100 in an upper direction.

Further, the output section 40 is provided on the upper side of the moving optical member 20.

That is, the light beam 100 is bent in the upper direction by the optical part 21 pivoted in the upper direction and is emitted from the output section 40.

Further, as shown by FIG. 2B, the side faces of the support members 20a on the sides of attaching the moving optical members 20 are uniquely determined by to which sides the moving the optical members 20 are disposed relative to the light beam 100 and are opposed to each other by interposing the light beam 100. Thereby, an interval necessary for installing the moving optical members 20 can be narrowed.

Therefore, according to the optical switch 3, not only an effect similar to that of the optical switch 1 is achieved but also the optical switch 3 can further be compact.

(Fifth Embodiment)

Figure 8:
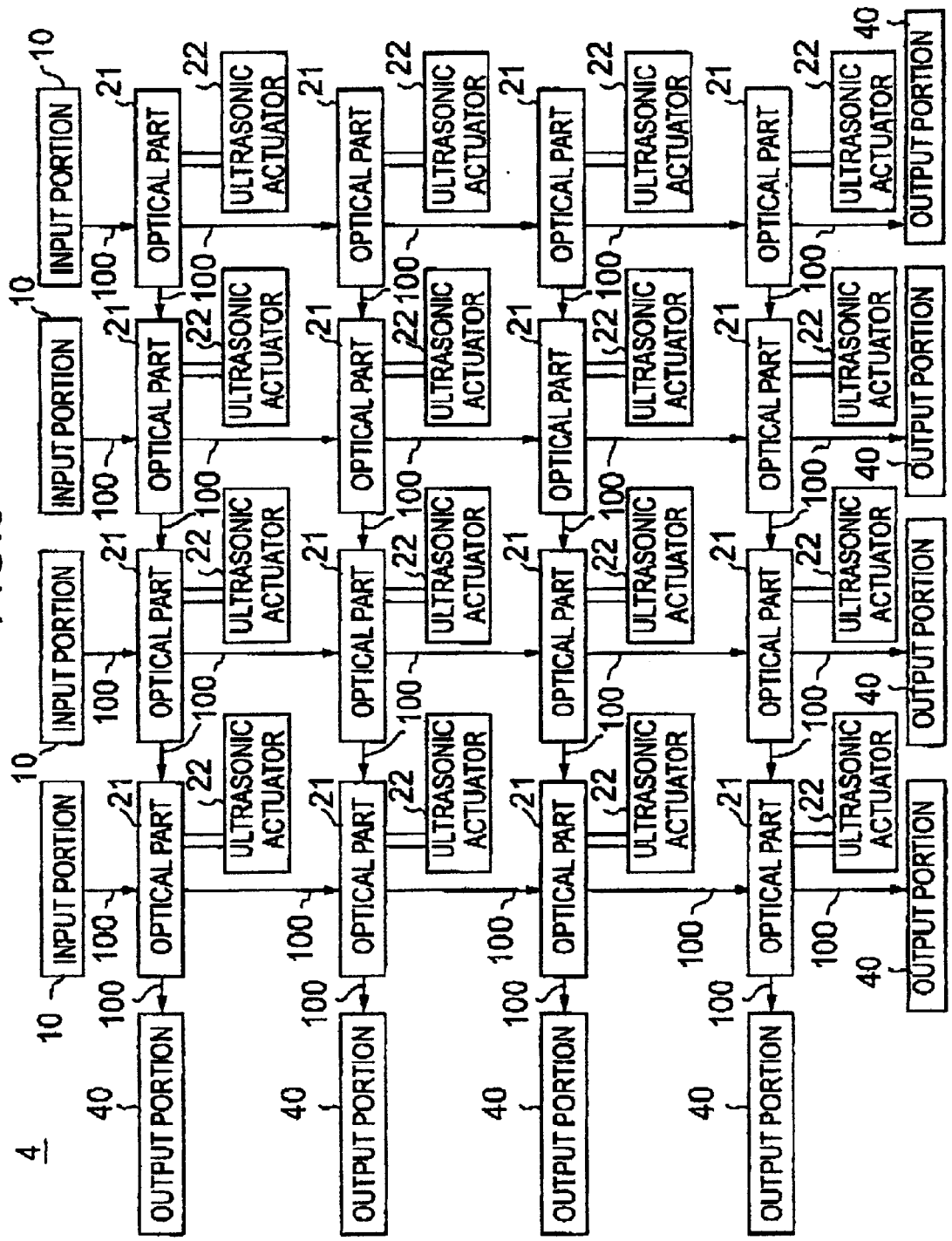
FIG. 8 is a block diagram showing a constitution of an optical switch according to a fifth embodiment of the invention.
Figure 9:
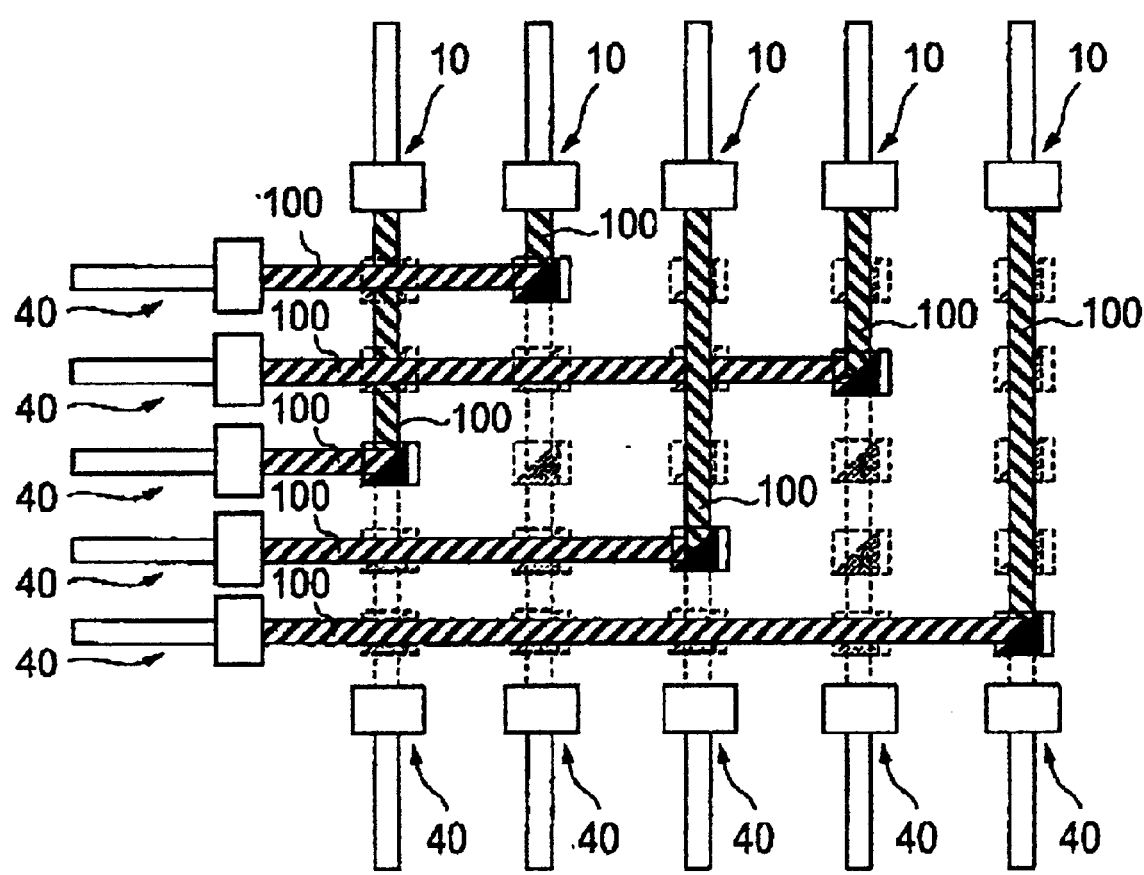
FIG. 9 is an outline plane view of the optical switch of FIG. 8.

According to an optical switch 4 constituting a fifth embodiment of the invention, as is generally shown by FIG. 8 and FIG. 9, a plurality of the moving optical members 20 are arranged in a shape of a matrix, further, proximately to contiguous two sides of the moving optical members 20 arranged in the shape of the matrix, the output sections 40 are installed at respective rows or columns of the respective moving optical members 20, further, the input sections 10 are installed at one of remaining sides thereof for respective rows or columns of the respective moving optical members 20.

That is, as shown by FIG. 9, the optical switch 4 is an optical switch of an M×N type for outputting the light beams 100 imputed from the respective input sections 10 from desired ones of the output sections 40 by pertinently controlling the moving optical members 20 and a single one of the optical switch 4 can deal with the plurality of light beams 100 (that is, optical signals). Therefore, in the case of dealing with a large-scaled network, a space necessary for installing the optical switch can be reduced.

(Sixth Embodiment)

Figure 10:
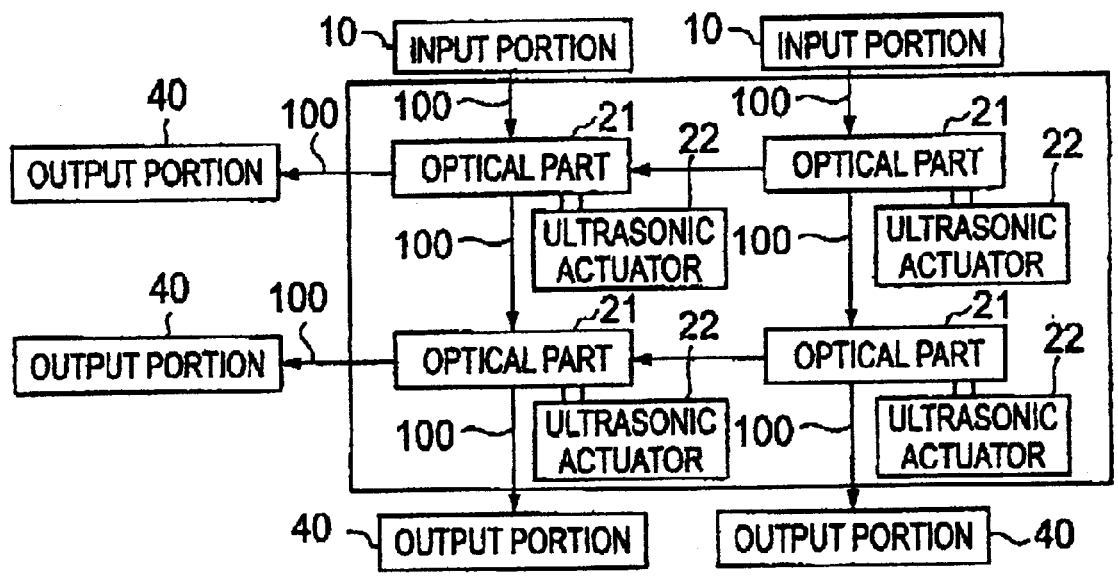
FIG. 10 is a block diagram showing a constitution of an optical switch according to a sixth embodiment of the invention.

As shown by FIG. 10, an optical switch 5 constituting a sixth embodiment of the invention is an optical switch having a type the same as that of the optical switch 4 and is of a 2×2 type.

Figure 11:
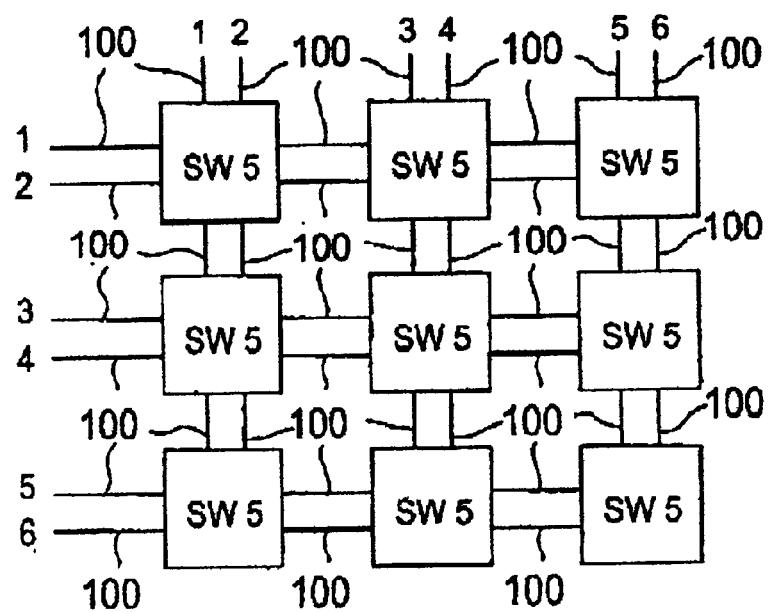
FIG. 11 is a block diagram showing an application example of the optical switch of FIG. 10.

According to the optical switch 5, not only an effect similar to that of the optical switch 4 is achieved but also, as shown by FIG. 11, a further complicated optical switch can easily be constituted by arranging the optical switches 5 in a shape of a matrix in the same directions. That is, optical switches of various types can be fabricated at low cost by constituting basic parts by the optical switches 5 and combining the optical switches 5. Here, further various types of optical switches can be fabricated by including also the optical switches 4 in the parts.

Further, the invention is not limited to the above described respective embodiments but can naturally be changed pertinently within a range not deviated from the gist of the invention also with regard to specific arrangements of constituent elements or the like.

For example, there may be constructed a constitution of providing a moving amount of the respective moving body, that is, positional information of the optical part from a power consumption amount and a driving direction of the respective ultrasonic actuator.

Further, there may be constructed a constitution of providing the projections 20b in the optical switch 1 according to the second embodiment. In this case, there is constructed a constitution in which the moving body 22d is positioned by the projections 20b and the position of the moving body 22d is recognized by the encoder 23.

As described above, according to the optical switch of the invention, the optical switch can be made compact since a temperature sensor or the like is not needed, further, the productivity is increased since there is not a member which needs fine fabricating steps as in a conventional member such as a waveguide or the like.

What is claimed is:

1. An optical switch comprising:
   at least one input section for inputting a light beam;
   a plurality of movable optical members each comprised of a piezoelectric actuator for inputting the light beam from the input section and for individually switching an optical path of the light beam, each of the piezoelectric actuators having a piezoelectric body for undergoing oscillating movement and a movable body frictionally driven by oscillating movement of the piezoelectric body;
   driving control means for driving the piezoelectric bodies of the piezoelectric actuators and for controlling positions of the piezoelectric bodies to switch the optical path of the light beam; and
   at least one output section for outputting the light beam outputted from the piezoelectric actuators.

2. An optical switch according to claim 1; wherein the plurality of piezoelectric actuators are disposed in series with a direction of the light beam.

3. An optical switch according to claim 2; wherein the at least one input section comprises a plurality of input sections disposed in a parallel relation to one another with respect to a direction of the light beam.

4. An optical switch according to claim 1; wherein the at least one input section comprises two input sections disposed in parallel direction to one another, the plurality of movable optical members comprises two piezoelectric actuators each corresponding to a respective one of the input sections, and the at least one output section comprises two output sections disposed in a parallel relation to one another with respect to a direction of the light beam and at positions opposite to the input sections.

5. An optical switch device comprising a plurality of optical switches according to claim 4 connected together.

6. An optical switch according to claim 3; wherein a first preselected number of the piezoelectric actuators are arranged in a zigzag pattern relative to the light beam.

7. An optical switch according to claim 6; wherein a second preselected number of the piezoelectric actuators different from the first Preselected number of the piezoelectric actuators are arranged in the zigzag pattern relative to a light beam input by the input section and different from the light beam corresponding to the first piezoelectric number of the piezoelectric actuators; and wherein the first and second number of piezoelectric actuators are disposed in similar horizontal positions in the zigzag pattern.

8. An optical switch according to claim 1; wherein the piezoelectric body of each of the piezoelectric actuators is configured to undergo contraction and expansion movement to vibrationally drive the movable body.

9. An optical switch according to claim 1; wherein each of the piezoelectric actuators comprises a rotational-type piezoelectric actuator.

10. An optical switch according to claim 1; wherein each of the piezoelectric actuators comprises a linear-type piezoelectric actuator.

11. An optical switch according to claim 1; wherein the driving control means includes means for generating a preparatory signal for preparing to drive the piezoelectric actuators.

12. An optical switch according to claim 1; wherein the driving control means includes a self-excited oscillating circuit.

13. An optical switch according to claim 1; further comprising a support member forming at least a portion of the driving control means for movably supporting the piezoelectric actuators.

14. A method of controlling an optical switch, comprising the steps of: providing an optical switch according to claim 1; and simultaneously driving and controlling the piezoelectric actuators with the driving control means to switch the optical path of the light beam.

15. An optical switch according to claim 1; wherein the at least one input section comprises a plurality of input sections disposed in parallel relation to one another.

16. An optical switch comprising:

an input part for inputting a light beam;

an optical part for receiving the light beam from the input part;

a piezoelectric actuator having a piezoelectric body for undergoing oscillating movement and a movable body connected to the optical part and frictionally driven by oscillating movement of the piezoelectric body to thereby move the optical part for switching an optical path of the light beam;

driving means for driving the piezoelectric body of the piezoelectric actuator to frictionally drive the movable body; and an output part for outputting the light beam from the optical part after the optical path of the light beam has been switched.

17. An optical switch according to claim 16; wherein the driving means includes means for driving the piezoelectric body of the piezoelectric actuator so that the piezoelectric body undergoes contraction and expansion movement to vibrationally drive the movable body.

18. An optical switch comprising:

an input section for inputting a light beam;

a plurality of optical parts each for selectively receiving the light beam from the input section;

a plurality of piezoelectric actuators each corresponding to a respective one of the optical parts, each of the piezoelectric actuators having a piezoelectric body for undergoing oscillating movement and a movable body connected to the respective optical part and frictionally driven by oscillating movement of the piezoelectric body to thereby move the optical part for switching an optical path of the light beam;

driving means for selectively driving the piezoelectric body of each of the piezoelectric actuators to frictionally drive the movable body thereof; and an output section for selectively outputting the light beam from a respective one of the optical parts after the optical path of the light beam has been switched.

19. An optical switch according to claim 18; wherein the driving means includes means for selectively driving the piezoelectric body of each of the piezoelectric actuators so that the piezoelectric body undergoes contraction and expansion movement to vibrationally drive the corresponding movable body.

* * * * *